Jan. 15, 1963 V. R. BAUMAN 3,073,147
FLOW METER CIRCUIT CHECKER
Filed Nov. 5, 1959 3 Sheets-Sheet 2

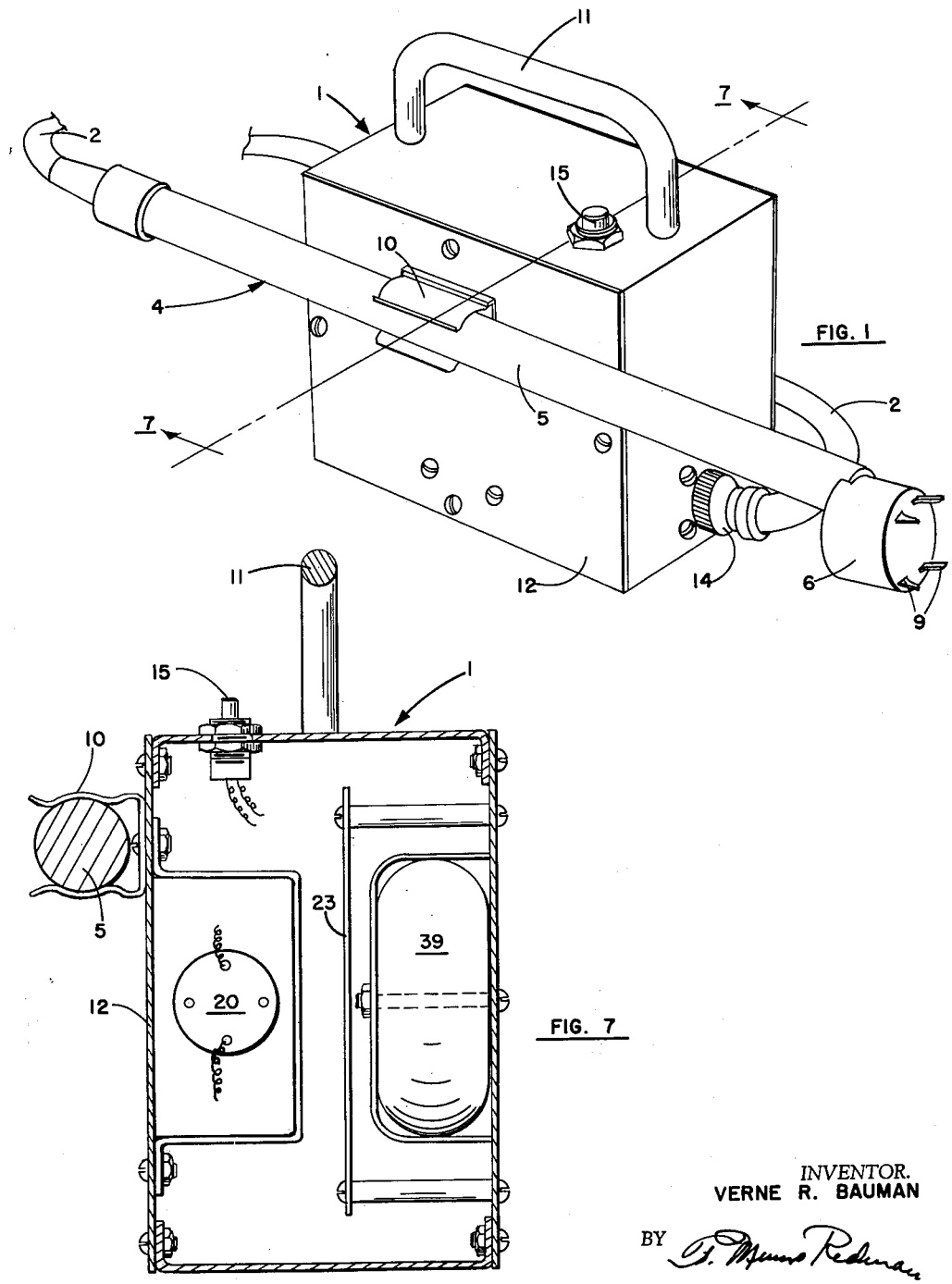

INVENTOR.
VERNE R. BAUMAN
BY
ATTORNEY

Jan. 15, 1963   V. R. BAUMAN   3,073,147
FLOW METER CIRCUIT CHECKER
Filed Nov. 5, 1959   3 Sheets-Sheet 3

INVENTOR.
VERNE R. BAUMAN
BY
ATTORNEY

United States Patent Office 3,073,147
Patented Jan. 15, 1963

3,073,147
FLOW METER CIRCUIT CHECKER
Verne R. Bauman, Canoga Park, Calif., assignor to North American Aviation, Inc.
Filed Nov. 5, 1959, Ser. No. 851,052
10 Claims. (Cl. 73—3)

This invention relates to circuit checking equipment, and particularly to means for determining the condition of flow meter recording circuits.

In measuring the flow of fuel and other liquids, such as liquid oxygen and liquid nitrogen, in missiles, high performance aircraft, or equivalent vehicles it is conventional practice to use flow rate meters which are built into a test stand or into the vehicle proper. The information obtained from such meters is essential in order to determine system readiness, to coordinate the existing rate of flow with that programmed for particular points in the trajectory, and for related purposes, and may be utilized to actuate servo systems for proper control of operations. Difficulties have arisen in the past in connection with use of flow meters, since these devices are commonly installed in positions which are difficult to reach for direct testing, and it is possible for malfunctions to occur which do not appear, or are not recognized, in the associated equipment for some time.

One system for making such measurements involves the registering or recording of the volume of liquid passing through a flow meter by electromagnetic means. The rate of flow may be recorded by using the proportionality thereto of the voltage level, or envelope, of an alternating current induced in a pickup coil. This current is induced by the rotation of an impeller, driven by the liquid flow and made of a high permeability material such as Alnico or an equivalent alloy.

The present invention is intended for use in checking such a system, and consists of an oscillation generator producing alternating current test signals or impulses at controllable levels and frequencies in a probe or transfer coil which may be placed adjacent the pickup coil of the flow meter. Signals may be thus induced in the flow meter pickup coil, preferably in the absence of signals due to the rotation of the impeller. The induced signals will then pass through the circuitry associated with the flow meter and be registered on the flow meter recording means, just as would a signal induced by passage of fluid through the meter, if the equipment were functioning properly.

In the past, it has been necessary, in order to check the circuitry associated with such a flow meter to "dry-spin" the impeller. This involves rotating it by means such as forcing a gas, usually nitrogen, under pressure into the impeller line. Rotation thus induced is productive of a current which is picked up and recorded in normal fashion. However, driving a flow meter rotor in this fashion is frequently productive of harm to the meter so driven and is undesirable for various other reasons. For example, it is necessary to open the line to inject the gas under pressure into the system. This is inconvenient, as well as representing a possible source of contamination. Since the flow meter is not lubricated by the presence of liquid, the bearings may be damaged if excessive flows are permitted.

The present invention may utilize a probe type insertion coil of such length and shape as to permit inserting it adjacent the pickup coil of the flow meter, whatever its location in relation to the other equipment. The probe may then be connected by suitable flexible leads to the oscillator and power supply portions of the equipment.

In an alternative embodiment the entire device, including a smaller power supply, has been reduced in size so it may be housed in a cylindrical container about 1¼" in diameter and 6" long, with an extending neck of lesser diameter carrying the probe on its tip. Such a unit may weigh less than a pound and be completely self-contained.

The objects of the invention thus include providing a convenient method for determining the circuit readiness of a flow meter and its recording equipment.

Another object is to provide a compact, portable unit for checking the state of the circuit in a flow meter so located in the equipment in which it is designed to measure flows as to be practically inaccessible.

A still further object is to provide means for quickly and easily determining when a flow meter circuit is in a state of operational readiness prior to the passage of liquid to be measured therethrough.

These and other objects of this invention will become apparent from the following specification when taken with the accompanying drawings in which:

FIG. 1 is a generalized view of the circuit checker of the invention having the oscillator and the power supply disposed in one container and having a flexible lead extending to the probe member;

FIG. 7 is a sectional view of the embodiment of FIG. 1, taken as indicated by line 7—7 of that figure.

Figure 2:
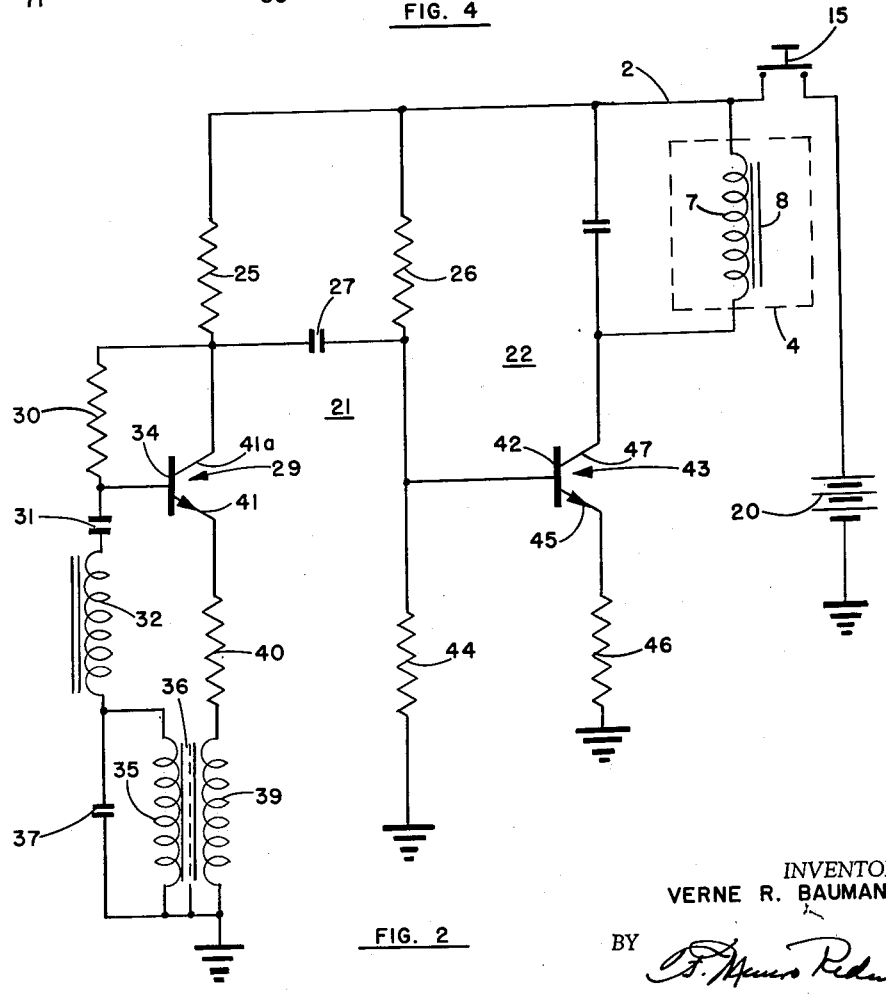
FIG. 2 is a schematic circuit diagram of the embodiment of FIG. 1.
Figure 6:
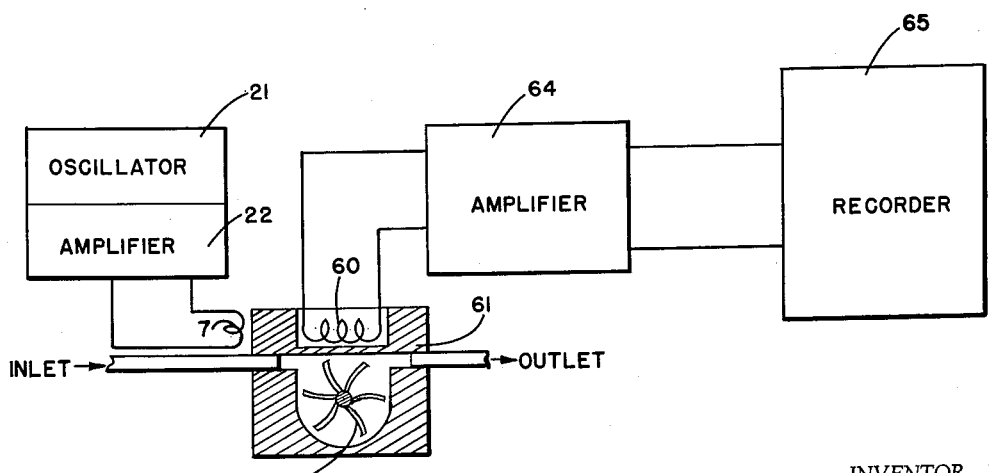
FIG. 6 is a schematic view of a flow meter, partially in section, showing how the circuit checker cooperates therewith.

The embodiment illustrated in FIGS. 1, 2, and 7 has a case 1 in which are disposed the power supply and the signal-generating circuitry, using an oscillator and a common collector amplifier stage as illustrated schematically in FIG. 2. A flexible connecting lead 2 extends from the case 1 to a probe assembly 4 having an elongated handle 5 terminated by a probe head 6. Probe head 6 contains a magnetic coil 7 having an iron core 8 and is connected to receive the oscillator output. The head 6 may have spacing members 9 extending therefrom. The spacing members 9 are placed in contact with the exterior of the flow meter 61 adjacent the pickup coil 60 disposed therein, as shown schematically in FIG. 6. Members 9 serve to maintain a constant spacing between the coils 7 and 60. A substantial uniformity is thus obtained in the level of the test current induced in the input to the flow meter circuit. For convenience in carrying, a resilient clamp 10 may be provided on the side of case 1 to receive the probe assembly 4. Case 1 may also be provided with a carrying handle 11 and sealed with suitable means, such as neoprene gaskets 12, and an appropriate connector 14 of conventional type between the connecting lead 2 and the circuitry enclosed in case 4. A spring-loaded push button 15 may be mounted in case 1 conveniently adjacent handle 11. Within case 1 is disposed the power supply, which may be a 22.5-volt battery 20, and, as seen in FIG. 2, first and second transistors which are employed in the oscillator circuit generally indicated as 21, and the amplifier circuit indicated generally as 22. These circuits may be made by printed circuit techniques, and be formed on supporting means such as a panel 23, shown in edge view in FIG. 7.

The button 15 on closing delivers current through a 10-kilohm, ½ watt resistor 25 to the collector 41 of transistor 29 and also applies biasing potential through a resistance 30 to the base 34 thereof. A capacitance 31 in series with a toroidal iron core coil 32 applies output from the base 34 of the transistor to ground through the primary 35 of a step-up autotransformer 36, which is shunted by a .022 mfd. capacitance 37. Equivalent means for stepping up the potential output of the transistor may also be used. The secondary 39 of the autotransformer 36 is connected through a resistance 40 to the emitter 41 and provides a step-up of 6:1 in the voltage output of the transistor 29. The stepped-up output is delivered from the collector 41A through the coupling capacitance 27 to the base 42 of the transistor 43. Base 42 is biased relative to ground by bias resistor 44. Emitter 45 of transistor 43 is returned to ground through a resistance 46. In this embodiment, a transistor gain of .33 was employed, which is adapted to provide, in cooperation with the other circuit constants, a gain of unity, which is desirable to permit oscillation.

The purpose of the amplifier is twofold: one, to provide isolation between the oscillator and the lead; and two, to provide sufficient power gain for the inductance load in the probe tip coil. The coupling of the oscillator 21 to the amplifier 22 through the capacitor 27 to the load resistor 25 in the collector circuit of the oscillator prevents the amplifier from having any substantial shunting effect on the isolator, and in addition, the collection load provides additional stabilization from power supply changes.

The purpose of the probe 7, or transfer coil, has been said to be to induce a flow of energy from the oscillator and amplifier to the flow meter pickup coil 60. Hence, the probe must be made small for use in restricted places, physically protected so that normal use will not damage the coil, and preferably provided with positioning means 9 as described above. The probe coil may be encased in a metal cup to prevent damage from bumping, and enclosed by a suitable potting compound.

In operation the oscillator circuit 21 is energized by pressing the push button 15, which completes the circuit through the oscillator transistor 29 and produces a current in the probe coil 7. The coil is held at the predetermined distance from the flow meter pickup coil by either the spacing members 9 or an equivalent arrangement. The alternating-current so induced in the pickup coil 60 of the flow meter 61 is comparable to that set up in coil 60 by the flow-induced rotation of the impeller 62, and is delivered through suitable amplifying means 64 to the recording equipment 65 associated with the device. If the circuit is open, or if other types of malfunction exist, no signal will be registered by the recording means 65 and the operator will then be aware that he cannot rely on the information received at this point. In addition to wiring errors, such failures might include an open coil, a faulty recording system, or other electrical malfunction. In the embodiment illustrated, the coil has a current flow of about 10 milliamperes, which requires that the push button switch 15 be spring-loaded so that battery current is used only when the unit is operated. It is anticipated that a battery life of approximately three months may be obtained, using conventional transistors of the 2N332 and 956 types for the oscillator 29 and amplifier 43, respectively, and the portable battery, as illustrated. The container may be made waterproof by the use of suitable gaskets of neoprene or the equivalent, and connecting members for the leads to the probe.

Figure 3:
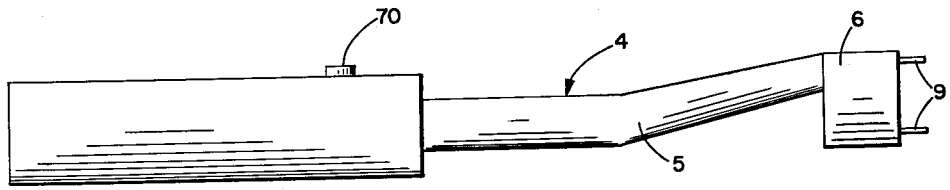
FIG. 3 is a perspective view of a miniaturized version of the device shown in FIG. 1, in which the oscillator, power supply, and probe are located in a single self-contained unit.
Figure 4:
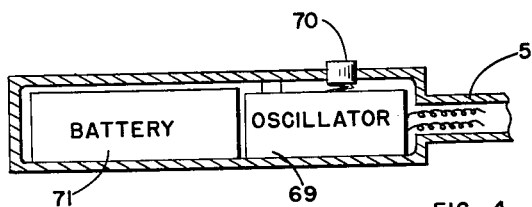
FIG. 4 is a view partially in section, showing additional details of construction of the miniaturized version of FIG. 3.
Figure 5:
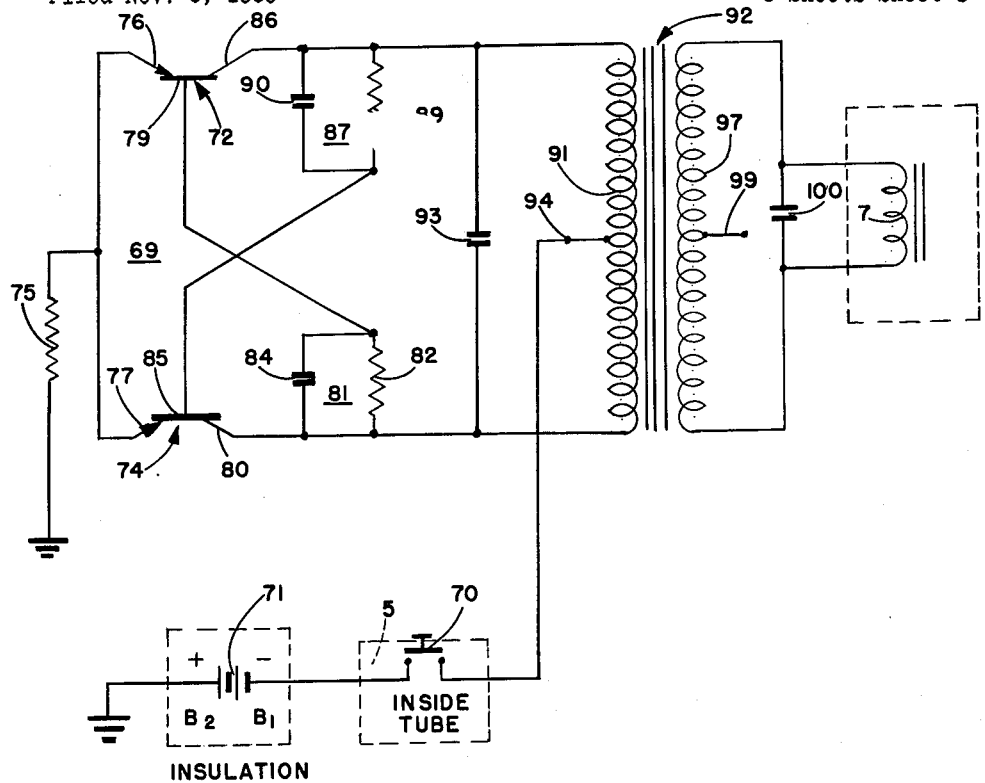
FIG. 5 is a schematic circuit diagram of the embodiment of FIG. 3.

An alternative embodiment is illustrated in FIGS. 3 and 4, with a schematic circuit diagram as shown in FIG. 5. This alternative form, which is a miniaturized and improved version of that shown in FIG. 1, has all of the elements enclosed in a single case with the probe mounted on a long neck extending therefrom. It utilizes a free-running multivibrator 69 arrangement as the oscillator circuit, which is energized through a spring-pressed switch button 70 from battery supply source 71. The multivibrator circuit 69 utilizes a first transistor 72 and a second transistor 74, which may be of the NPN silicon type, having a common input connection through the biasing resistor 75 to the emitters 76 and 77 respectively. The base 79 of first transistor 72 is connected to provide feedback to the collector 80 of the second transistor 74 through an R-C network 81 having a resistance 82 and a capacitance 84. Similarly, the base 85 of the second transistor 74 may be connected to provide feedback to the collector 86 of the first transistor 72 through an R-C network 87 having a resistance 89 and a capacitance 90. The multivibrator output is delivered in a conventional push-pull arrangement to the primary winding 91 of an iron core transformer 92. Primary 91 is shunted by capacitance 93 which determines the oscillator frequency. The primary is center-tapped at 94 to provide a connection to the negative side of the battery power supply, which is grounded to complete the circuit back through input biasing resistor 75 to the transistors 72 and 74. Push button 70 is held open by conventional resilient means, not shown, as in the embodiment of FIG. 1, since oscillation would otherwise commence as soon as the circuit was closed, which would produce an undesirable drain on the battery or other power source. The secondary 97 of transformer 92 is center-tapped at 99 and shunted by a capacitance 100. The transformer 97 delivers the output across this capacitance to the probe coil 7, from which it is transferred inductively to the pickup coil 60 in the flow meter 61.

By means apparent to those skilled in the art, a rearrangement of the flow meter and test circuitry here disclosed might be made to substitute a capacitive input to the flow meter from the probe for the inductive input herein disclosed.

The circuit parameters have been designed to produce oscillation immediately upon closing switch 70. In the particular embodiment shown in FIG. 5, a ratio of 1:1.81 has been found satisfactory between the number of primary and secondary transformer turns. This lower ratio is possible because the efficiency of the multivibrator circuit is greater than that of the base-coupled circuit of the embodiment of FIG. 1. Component values and ratings were as given below, which provide a relatively stable transistor configuration. The values and ratings are as follows:

Resistance 75 _____ 10 ohms, ½ watt.
Resistances 82 and 89 ____ 30 kilohms, ½ watt.
Capacitances 84 and 90 __ .25 microfarad, 200 wv. a./c.
Capacitances 42 and 50 __ 1.0 microfarad, 200 wv. a./c.

This embodiment is enclosed in a lightweight, compact, portable unit which may be held in one hand by the operator, or carried in his pocket, and used with facility in restricted spaces in the equipment in which the flow meter being checked is installed.

It will thus be seen that an improved device for checking the readiness of recording circuits associated with flow meters has been described, which is particularly useful in checking meters installed in positions to which direct access is difficult.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for checking in place electrical flow-measuring circuits having electromagnetic sensing means installed in equipment through which the quantity of material passing is to be registered and means for inducing in said sensing means an alternating current indicative of said quantity of material, comprising electrical means for inducing alternating test currents in said sensing means simulating the alternating currents induced by an actual flow of said material; and means for registering indications resulting from said test currents.

2. A device in combination with a flow meter circuit having an electromagnetic pickup coil therein and means for inducing in said coil a current indicative of flow therethrough, said device comprising an oscillator; electrical means for inducing current from said oscillator into said electromagnetic pickup coil simulating the current induced by actual flow; and means for registering currents so induced as an indication of the state of readiness of said flow meter circuit.

3. A testing device in combination with an electrical circuit having means arranged in said circuit to register the flow of material in equipment in which said circuit is installed including a sensing means and means inducing in said sensing means an alternating current indicative of said flow of material, said testing device comprising probe means; means for setting up an alternating current through said probe means; electrical means for introducing inductively in said sensing means in said registering circuit an alternating current from said probe means in the absence of the flow of material through said equipment but simulating the alternating current induced by actual flow of material; and means for observing said registering means as an indication of the condition of said circuit.

4. A flow meter checking circuit substantially as described in claim 3, wherein said means for setting up an alternating current comprise a first transistor having base, emitter, and collector elements, and arranged for oscillation, a high inductance disposed in the base circuit thereof; a step-up autotransformer, having a ratio of substantially 1:6 between the number of primary and secondary turns, disposed between said high inductance and said emitter; a second transistor arranged to act as an amplifier and having a base, an emitter, and a collector; coupling means associated with the collector of said first transistor and arranged to pass output therefrom to the base of said second transistor; and a probe coil having a magnetic core arranged to receive current from the collector of said second transistor.

5. A flow meter checking circuit substantially as described in claim 3, wherein said means of setting up an alternating current comprise a first transistor having a highly inductive output circuit and adapted to act as an oscillator; a second transistor adapted to act as an amplifier; means for stepping up the potential level of the output of said oscillator for application to said oscillator; means for coupling the output of said oscillator transistor to the base of said amplifier transistor; and means including a highly inductive probe coil adapted to receive the output of said amplifier.

6. A flow meter checking circuit substantially as described in claim 3, wherein said means for setting up an alternating current comprise a first transistor having base, emitter, and collector elements; a second transistor having base, emitter, and collector elements; means having resistance and capacitance for coupling the collector of said first transistor to the base of said second transistor; means having resistance and capacitance for coupling the collector of said second transistor to the base of said first transistor; a transformer having center-tapped primary and secondary windings; means for applying output current from said first transistor collector to one end of said center-tapped transformer primary; means for applying output current from said second transistor collector to the opposite end of said center-tapped transformer primary; capacitance means disposed across said primary for determining the frequency of said alternating current; capacitance means disposed across said transformer secondary; and highly inductive probe coil means disposed across said capacitance means and said secondary of said transformer.

7. A device substantially as described in claim 3, wherein said probe means comprise a pickup coil sealed in a head having an elongated handle and connected by flexible leads to said means for setting up alternating current, said means for setting up alternating currents comprising oscillator and amplifier circuits disposed in a separate case, and having power supply means disposed in said separate case.

8. In a flow meter test device substantially as described in claim 3, the combination of a case having disposed therein oscillator means; a power supply for said oscillator means; flexible lead means extending from said case; a probe handle adapted to receive said lead means, and having a probe head formed thereon containing magnetic coil means for transferring energy inductively from said oscillator means to said registering circuit.

9. In a flow meter substantially as described in claim 3, a handle adapted to contain said means for setting up alternating currents, comprising oscillator and amplifier circuit means; power supply means; an elongated neck; a sealed probe coil mounted on said neck; leads electrically connecting said probe coil to said oscillator and amplifier circuit means; and switch means disposed on said handle adapted to energize said probe coil from said amplifier.

10. A device in combination with a flow meter and associated circuit having electromagnetic pickup means and means for inducing in said pickup means an alternating current indicative of the rate of current flow through said meter, said device comprising an oscillator having a pair of transistors arranged in a free-running multivibrator circuit; highly inductive probe coil means adapted to receive the output of said oscillator and placed at a substantially uniform distance from said electromagnetic pickup means of said flow meter circuit to be checked; and spring-loaded switch means adapted to energize said oscillator, said device being adapted to cooperate with said flow meter circuit by inducing in said pickup means an alternating current simulating that induced therein by actual flow to indicate a condition of readiness when circuit malfunction is absent.

References Cited in the file of this patent

UNITED STATES PATENTS 1,851,818    Drake et al. _____ Mar. 29, 1932

OTHER REFERENCES

James: "An Induction Flowmeter Design Suitable for Radioactive Liquids," The Review of Scientific Instruments, vol. 22, No. 12, December 1951, pp. 989–1002. Copy in the Scientific Library or Div. 38.

Osborne: "Treasure Finding Modernized," Radio News, September 1946, pp. 30 and 31. Copy in the Scientific Library or Div. 38.